Feb. 10, 1959 C. E. NEISLER, JR., ET AL 2,872,690
INFLATABLE DEVICE OF PREDETERMINED SURFACE
CONTOUR AND METHOD OF MAKING SAME
Filed Aug. 15, 1955 3 Sheets-Sheet 1

INVENTORS
Charles E. Neisler, Jr.
Paul Mauney
BY
Edwin
ATTORNEYS

Feb. 10, 1959   C. E. NEISLER, JR., ET AL   2,872,690
INFLATABLE DEVICE OF PREDETERMINED SURFACE
CONTOUR AND METHOD OF MAKING SAME
Filed Aug. 15, 1955                    3 Sheets-Sheet 2

INVENTORS
Charles E. Neisler, Jr.
Paul Mauney
BY
ATTORNEYS

Feb. 10, 1959

C. E. NEISLER, JR., ET AL 2,872,690

INFLATABLE DEVICE OF PREDETERMINED SURFACE
CONTOUR AND METHOD OF MAKING SAME

Filed Aug. 15, 1955

INVENTORS
Charles E. Neisler, Jr.
Paul Mauney
BY
ATTORNEYS

United States Patent Office 2,872,690
Patented Feb. 10, 1959

2,872,690
INFLATABLE DEVICE OF PREDETERMINED SURFACE CONTOUR AND METHOD OF MAKING SAME

Charles Eugene Neisler, Jr., and Paul Mauney, Kings Mountain, N. C., assignors to Neisler Brothers, Incorporated, a corporation of North Carolina Application August 15, 1955, Serial No. 528,426

13 Claims. (Cl. 5—349)

This invention relates generally to an inflatable device of predetermined surface contour and method of making same.

One object of the present invention is the provision of a light weight, internally reinforced, and readily collapsible inflatable device which may be of any desired surface contour, said device being utilizable for a multitude of utilitarian applications in any desired form, such as in the form of floats, pontoon bridges, buoyant life raft sections, vehicle traction devices, air foils or air foil sections, etc. It has also been proposed to utilize an inflatable device formed pursuant to the present invention for the formation of a landing field, or landing field sections.

Another object of the present invention is the provision of an inflatable device of predetermined surface contour which is provided with internally disposed structure for reinforcing the device and predetermining the shape thereof, said internal structure including a series of tension elements which are oriented in a novel manner for reinforcing associated surface portions of the device.

Another object of the present invention is the provision of an inflatable vehicle traction device which is of light weight construction, readily collapsible, and which is capable of supporting a heavy load with low pressure inflation, said traction device being adapted to be driven from a centrally disposed drive part or hub member.

Another object of the present invention in the provision of an inflatable vehicle traction device of the above character which is provided with a series of internally disposed tension elements for internally reinforcing the casing and transmitting the torque applied thereto from a centrally disposed drive part.

Another object of the present invention is the provision of a vehicle traction device of the above character in which the drive part and the casing walls associated with said drive part are relatively rotatable whereby to inhibit the direct transmission of torque from said part to said walls.

Yet another object of the present invention is the provision of a method of making an inflatable device of predetermined surface contour of the aforenoted construction which is simple in character, and which readily lends itself to low cost mass production.

The above and other objects, features and advantages of the present invention will be more fully understood from the following description considered in connection with the accompanying illustrative drawings.

In the drawings which illustrate the best modes now contemplated by us for carrying out our invention:

Figure 1:
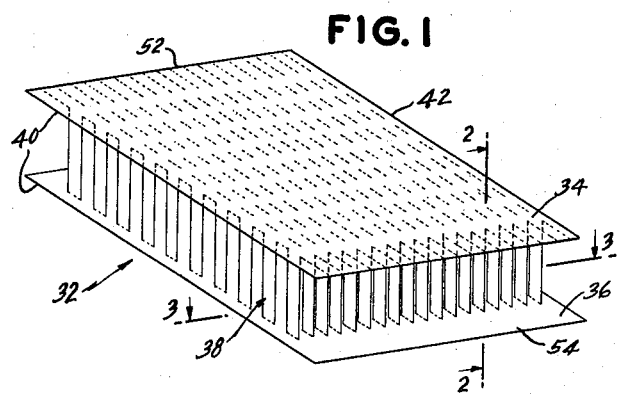
Fig. 1 is a perspective view of a length of mattress fabric which is adapted to be formed into an inflatable device of predetermined surface contour.
Figure 2:
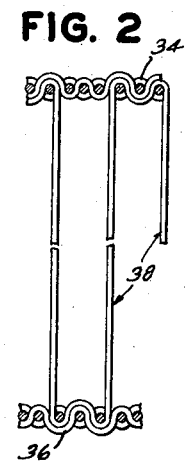
Fig. 2 is a sectional view, on an enlarged scale, taken on the line 2—2 of Fig. 1.
Figure 3:
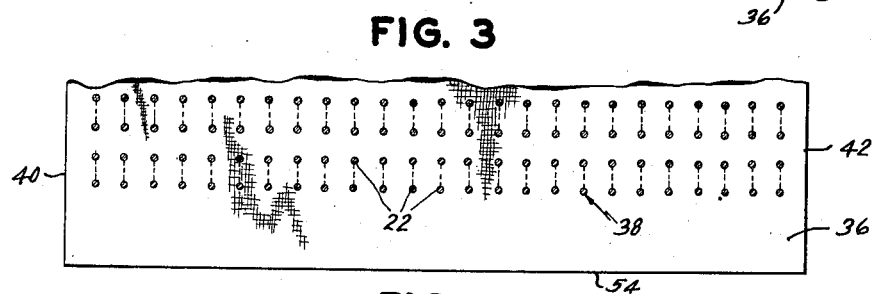
Fig. 3 is a sectional view, on an enlarged scale, taken on the line 3—3 of Fig. 1.
Figure 4:
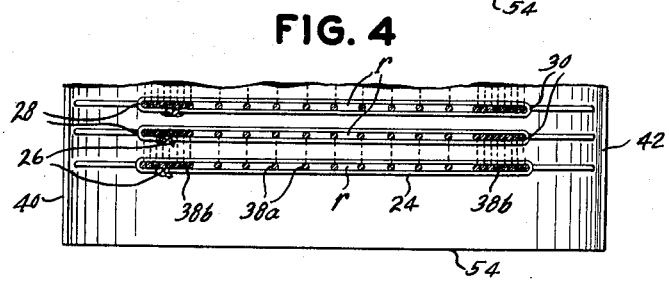
Fig. 4 is a view similar to Fig. 3 showing a series of tie elements associated with a companion series of flexible elements for drawing the latter inwardly of the mattress fabric a predetermined amount pursuant to the present invention.
Figure 5:
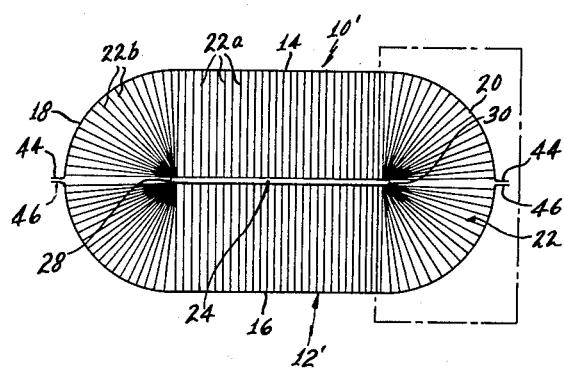
Fig. 5 is a diagrammatic vertical sectional view of a semi-finished inflatable device of predetermined surface contour.
Figure 6:
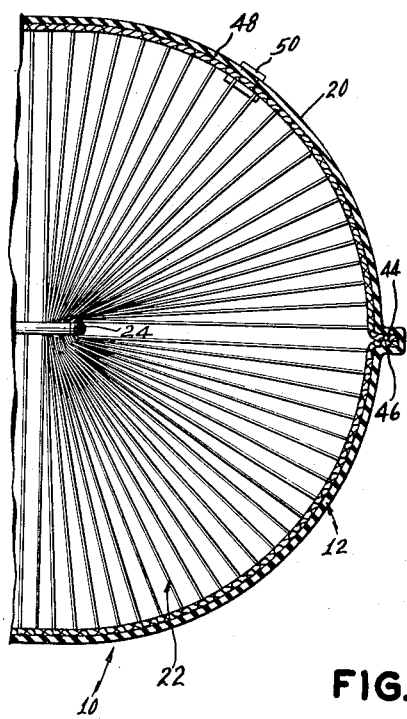
Fig. 6 is a fragmentary vertical sectional view of a finished inflatable device of predetermined surface contour formed according to the present invention.

Referring to the drawings, and more particularly to Figs. 1 through 6 thereof, there is shown an inflatable device 10 of predetermined surface contour which comprises a casing 12, formed of flexible fluid impervious material, which in its inflated condition defines said predetermined surface contour. The casing 12 includes opposite side walls 14 and 16 and an opposite pair of side wall portions 18 and 20 of arcuate configuration, said casing being internally reinforced by means of the series of flexible elements 22 which extend internally of said casing in a manner to be described in detail hereinafter. As best shown in Figs. 5 and 6, it will be noted that the flexible elements 22 include a series of flexible elements 22a which are secured at their opposite ends to the opposite sides 14 and 16, respectively, of the casing, and a series of flexible elements 22b which are secured at their opposite ends to their associated opposite side wall portions 18 and 20.

In order to orient the flexible elements 22b in radially extending disposition, there is provided a series of tie elements 24 which draw the flexible elements 22b inwardly of the wall portions 18 and 20 and retain said flexible elements in such inwardly drawn dispositions. Each of the tie elements 24 is looped around a companion series of flexible elements 22 disposed in a row r as best shown in Fig. 4 and the opposite ends of said tie elements are tied together as indicated at 26 to retain their companion flexible elements in a predetermined drawn disposition. Accordingly, the tie elements 24 draw a group of flexible elements, namely the elements 22b, in the region of the opposite ends of the tie elements, inwardly of the opposite wall portions 18 and 20 to thereby orient said elements 22b in predetermined dispositions relative to the wall portions 18 and 20 whereby said elements 22b define tension elements for internally reinforcing said opposite wall portions. Thus the tie elements 22b extend radially from an associated opposite end 28, 30 of the tie elements 24 to an associated opposite wall portion 18, 20 for internally reinforcing the latter in the inflated condition of the casing 12. From the above it will be apparent that the series of flexible elements 22a internally reinforce the walls 14 and 16 whereas the radially extending flexible elements 22b internally reinforce the opposite wall portions 18 and 20, said flexible elements constituting tension elements in the inflated condition of the casing 12. In the inflated condition of the casing 12 the tie elements 24 extend substantially medially of the opposite sides 14 and 16 of the casing in a plane substantially parallel to said opposite sides, it being noted that the tie elements 24 are looped around the elements 22 without any direct securement thereto so that the initiation of the casing will be effective to position said tie elements in such medial plane. The tie elements 24 of the embodiment of Figs. 1 through 6 are constituted by lengths of cord which are looped around companion groups of flexible elements 22, although it will be apparent that said tie elements may be constituted by other than cords and that the series of flexible elements 22b may be retained in the desired inwardly drawn dispositions in any desired manner. Any number of flexible elements 22b may be drawn inwardly of the opposite wall portions 18 and 20 and may be so drawn to any desired degree whereby to predetermine the contour of said opposite wall portions. In the illustrated embodiment of Figs. 1 through 6, the opposite wall portions 18 and 20 are of generally arcuate configuration with the flexible elements 22b shown radially extending a uniform amount from the opposite ends 28 and 30 of the tie cords 24, it being apparent that the tie cords and the series of flexible elements 22b may be relatively arranged in any predetermined manner in accordance with the desired contour and the desired internal reinforcement of the opposite wall portions 18 and 20. While the tie cords 24 are shown as being looped around companion rows r of flexible elements 22, it will be apparent that, if desired, said tie cords may be directly secured to such flexible elements or to selected flexible elements in any desired manner whereby to retain said rows in the desired drawn dispositions. The inflatable device 10 is formed from a blank or length of mattress fabric 32 pursuant to the method now to be described in detail.

The mattress fabric 32 may be of any conventional construction or may be of the construction disclosed in application Serial No. 360,435, filed Jan. 9, 1953, now Patent No. 2,848,018, for Improvements in Fabric and Method of Making Same in the name of Charles E. Neisler, Jr. and assigned to the assignee herein. The mattress fabric 32 of the illustrated embodiment comprises a pair of woven fabrics 34 and 36 having intermediate threads 38 extending therebetween and woven thereto, said pair of fabrics being disposed in laterally spaced confronting disposition with the intermediate threads 38 being transversely disposed between the fabrics 34 and 36. If a greater spacing between the fabrics 34 and 36 is desired than is obtainable by the use of conventional methods and apparatus, mattress fabric formed pursuant to the disclosure of the above referred to copending application may be utilized. It will also be understood that the fabrics 34 and 36 may be of any conventional construction and may be formed of any suitable material and similarly the threads 38 may be formed of any suitable material and may be integrated with the fabrics 34 and 36 in any desired manner. Accordingly, while the mattress fabric 32 is woven on a conventional loom it will be understood that it is within the scope of the present invention to form such fabric in any desired manner whereby to provide a pair of spaced fabrics interconnected by transversely extending threads, or the like.

The threads 38 are adapted to form the flexible elements 22 of the inflatable device 10 and are accordingly adapted to internally reinforce said device. The opposite sides 40 and 42 of the fabric 32 are adapted to be internally reinforced by the flexible elements 22b and to this end the rows r of threads 38, which extend between the sides 40 and 42, are drawn inwardly of the fabric 32 by the tie elements 24 in the manner described above. Thus a tie cord 24 is looped around each row r of threads 38 extending between the opposite sides 40 and 42 of the fabric 32 and the free ends of the tie cords are tied as indicated at 26 in a manner to retain the threads 38b of the rows in inwardly drawn dispositions relative to the opposite sides 40 and 42. Thus a series of threads or flexible elements 38b, adjacent the opposite ends of the tie cords 24, will be drawn and retained inwardly of the opposite sides 40 and 42 of the fabric 32 and said flexible elements are adapted to define the flexible elements 22b which internally reinforce the opposite wall portions 18 and 20 of the inflatable device 10. The threads or flexible elements 38a disposed between the flexible elements 38b, are adapted to define the flexible elements 22a of the inflatable device 10 and are accordingly adapted to internally reinforce the opposite side walls 14 and 16 of said inflatable device. Thus the rows r of threads or flexible elements 38 may be uniformly or non-uniformly drawn inwardly of the fabric 32 to any desired degree and may be retained in inwardly drawn dispositions by means of the tie cords 24. The series of tie cords 24 extend transversely of the flexible elements or threads 38 and are laterally spaced corresponding to the spacing of the rows r of threads or flexible elements 38. The fabrics 34 and 36 are now in condition to be manipulated to define the casing 12', shown in Fig. 5, which is in a semi-finished condition.

The free longitudinally extending marginal edges 44 and 46 at the opposite wall portions 18 and 20 of casing 12' are secured together in overlapping disposition in any suitable manner, for example by a sewing operation, an adhesive securing operation, or the combination thereof. The casing 12' is provided with an external layer 48, as shown in Fig. 6, of any fluid impervious material such as rubber, rubber compounds, plastic or the like to render the casing 12 of the finished inflatable device 10 fluid impervious and to impart to said casing the requisite external surface characteristics for the particular application of the inflatable device. It will be apparent that the external layer 48 may be applied to the external surfaces of the casing 12' in any desired manner. A suitable conventional valve 50, which provides for the controlled inflation and deflation of the casing 12, is suitably integrated with a wall portion of the casing. From the above it will be apparent that the semi-finished inflatable device 10' is formed into a finished inflatable device 10 by securing the marginal edges 44 and 46 to each other as described above and applying to the casing 12' an external layer 48 to render the casing fluid impervious. Thus the flexible elements 22 internally reinforce the inflatable device 10 and provide for the desired distribution of stresses applied to the casing 12. Each of the flexible elements 22 transmits and distributes the stresses applied to the inflatable device to an adjacent area of the casing whereby the provision of the series of elements 22 will effect a substantial reinforcement of the casing. The flexible elements 22 may be arranged and spaced in any desired manner in the casing and said elements are preferably disposed in closely adjacent relation in order to provide a uniform distribution and transmission of the casing stresses. If desired, the tie cords 24 or similar devices may be utilized to internally reinforce an opposite pair of wall portions, corresponding to the ends 52 and 54 of the fabric 32, in which case the tie cords 24 will be associated with companion rows of threads or flexible elements 38 extending between said opposite ends of the fabric 32. Accordingly, the tie cords 24 may extend between the opposite sides 40 and 42 or the opposite ends 52 and 54 of the fabric 32 or may extend between both said opposite ends and said opposite sides whereby to internally reinforce corresponding wall portions of the inflatable device 10 formed from said fabric.

Figure 7:
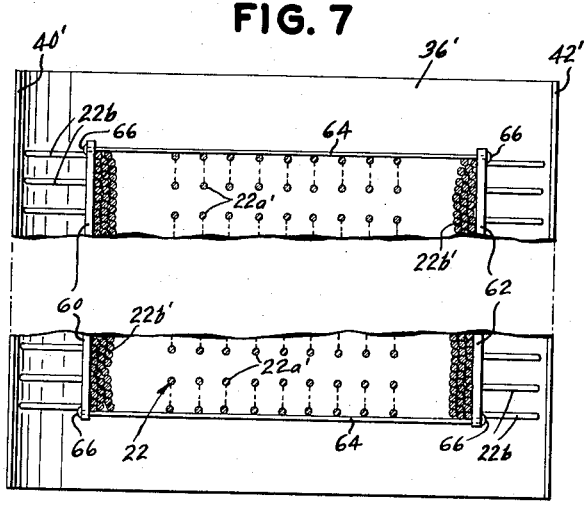
Fig. 7 is a view similar to Fig. 4 illustrating a modified arrangement for drawing the flexible elements inwardly of the mattress fabric.
Figure 8:
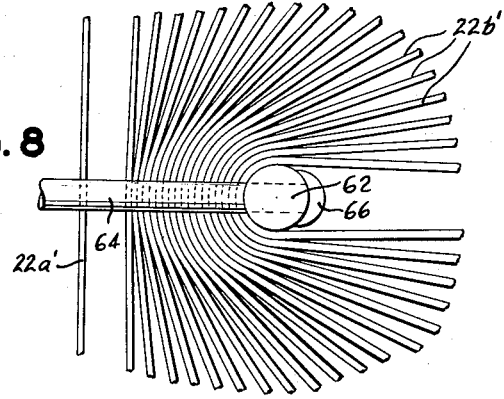
Fig. 8 is a view similar to Fig. 6 corresponding to the embodiment of Fig. 7.

With reference to Figs. 7 and 8, there is shown a modified arrangement for drawing the flexible elements 38 inwardly of the opposite wall portions 40' and 42' and for retaining said flexible elements in such inwardly drawn dispositions. The embodiment of Figs. 7 and 8 is similar to the first described embodiment except that a pair of laterally spaced relatively rigid tie members 60 and 62 are utilized in place of the tie cords 24 of the first described embodiment for a similar purpose. The tie members 60 and 62 may have any desired degree of rigidity and are retained in predetermined spaced relation by means of a series of connecting elements 64, which may be constituted by lengths of wire, flexible cords, or the like. If desired, the connecting elements 64 may be relatively rigid so as to define with the tie members 60 and 62 a relatively rigid frame for applications in which such a relatively rigid frame is desired. The connecting elements 64 may be headed at their opposite ends as indicated at 66 in any suitable manner in order to provide for the retention of the tie members 60 and 62 in predetermined spaced relation. From the above it will be apparent that the tie members 60 and 62 will be effective to retain the series of flexible elements 22b' in inwardly drawn dispositions in the manner described above whereby to internally reinforce associated wall portions in the manner described above in detail, it being noted that the flexible elements 22a' correspond to the flexible elements 22a of the first described embodiment. Thus the flexible elements 22 may be retained in the above described dispositions by means of the series of tie cords 24 or by means of the relatively rigid tie members 60 and 62 which are suitably retained in predetermined spaced relation.

Figure 9:
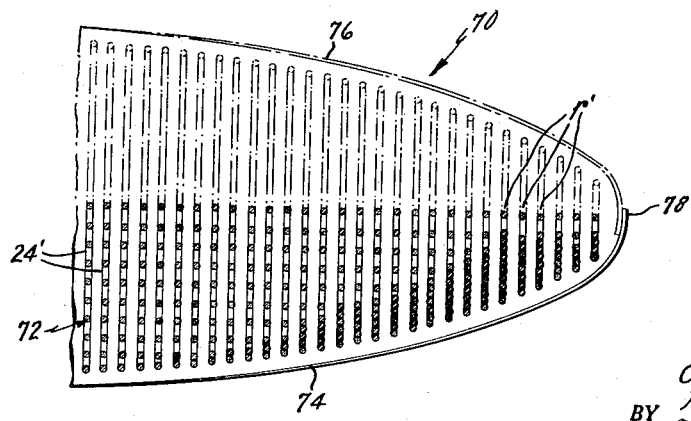
Fig. 9 is a fragmentary diagrammatic representation of a modified form of inflatable device of predetermined surface contour.

With reference to Fig. 9, there is shown a section 70 of an inflatable device of airfoil surface contour, said surface contour being predetermined in the manner described above by the inward drawing of the rows r' of flexible elements 72, which correspond to the elements 38 of the first embodiment. The rows r' of flexible elements 72 are drawn inwardly of the walls 74 and 76 a progressively greater amount towards the end 78 of the section 70, corresponding to the desired surface contour, said section being formed pursuant to the method described above in detail except that the rows r' of flexible elements 72 are non-uniformly drawn and retained inwardly of the opposite walls 74 and 76. Thus the tie cords 24', which are utilized to inwardly draw the flexible elements 72 and to retain the latter in their inwardly drawn condition, are of progressively shorter length towards the end 78 of the section 70 whereby it will be apparent that an inflatable device of internally reinforced construction may be formed having any desired contour utilizing the method described above in detail.

Figure 10:
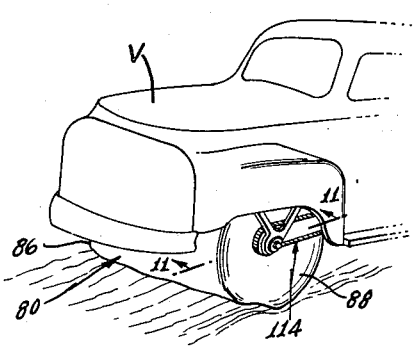
Fig. 10 is a front perspective view of a vehicle traction device formed according to the present invention, shown mounted to a vehicle.
Figure 11:
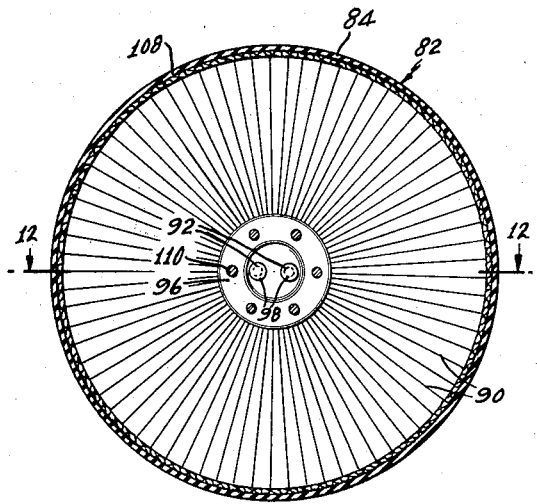
Fig. 11 is a sectional view, on an enlarged scale, taken on the line 11—11 of Fig. 10.
Figure 12:
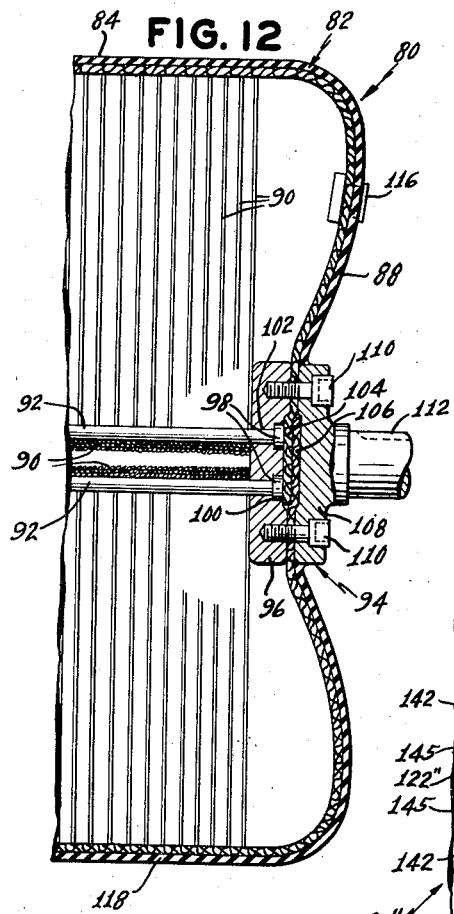
Fig. 12 is a sectional view, on an enlarged scale, taken on the line 12—12 of Fig. 11.

With reference to Figs. 10–12, there is shown a traction device 80 which is formed pursuant to the present invention and which is of the general character of the traction device disclosed in our application, Serial No. 504,435, filed April 28, 1955, now Patent No. 2,824,592 for Vehicle Traction Device and Method of Making Same, said application being assigned to the assignee herein. In Fig. 10 the traction device 80 is shown mounted across the front end of a vehicle V for supporting said vehicle for movement over the ground, said traction device comprising a casing 82 formed of flexible fluid impervious material which is adapted to be inflated to a relatively low pressure, although it will be understood that said casing may be inflated to a relatively high pressure, if desired. The casing 82 is formed of fabric material corresponding to fabric material 32 having relatively long flexible elements 38 extending between the laterally spaced fabrics 34 and 36, it being understood that such fabric material may be formed in the manner of the above referred to copending application. The casing 82 comprises a cylindrical wall 84 which forms the rolling surface of the traction device and oppositely disposed end walls 86 and 88, there being provided a series of flexible elements 90 which extend radially around the tie members 92 from said cylindrical wall. The tie members 92 are rigid and collectively define the axis of revolution of the traction device, it being understood that said tie members generally correspond to the tie members 60 and 62 of the embodiment of Figs. 7 and 8. Thus the opposite ends of the flexible elements 90 are secured in spaced relations to the cylindrical wall 84 and are looped around a companion rigid tie member 92. The cylindrical shape of the wall 84 is imparted thereto by drawing the tie members 92 towards each other the requisite amount to impart to such wall a substantially circular cross section, said members 92 being in closely adjacent relation. From the above it will be apparent that by drawing the flexible elements 90, which correspond to the elements 22 of the first embodiment, uniformly inwardly a sufficient amount as by means of the tie members 92 an inflatable device of generally circular cross section may be obtained. The tie members 92 are retained in the desired predetermined relation and are rigidly coupled to each other by means of a pair of coupling devices 94 which are associated with the opposite end walls 86 and 88 of the casing. The opposite ends of the tie members 92 are secured to the coupling parts 96 of the coupling devices 94 in any suitable manner, for example by means of a headed portion 98 provided on the opposite ends of the tie members, said headed portions being disposed in complementary recesses 100 provided in said coupling parts 96. It will be noted that the coupling part 96, shown in Fig. 12, is apertured therethrough as indicated at 102 for the extension therethrough of one end of the tie bars 92. While there is illustrated in Fig. 12 a single coupling device 94 which is associated with the end wall 88 it will be understood that the opposite end of the casing 82 is similarly constituted and is provided with a coupling device 94 associated with the end wall 86. The inner portions 104 and 106 of the end wall 88 are disposed in overlapping disposition and are secured in fluid sealing relation by means of the coupling device 94. More particularly, the portions 104 and 106 are clamped between the coupling part 96 and the complementary coupling part 108 by means of the series of peripherally spaced clamping bolts 110. The coupling part 108 is provided with a projecting shaft portion 112 which constitutes the drive shaft for the vehicle traction device, said drive shaft or part being adapted to be driven from any suitable power source through the intermediation of the chain drive 114 shown in Fig. 10. Thus the coupling devices 94 effectively couple the tie members 92 to each other and to the drive shaft 112 and also provide for an effective seal at the end walls 86 and 88. The torque applied by the drive shaft 112 will be transmitted to the casing by means of the series of flexible elements 90 in the manner described in detail in the aforereferred to copending application, Serial No. 504,435, now Patent No. 2,824,592. The members 92 and coupling devices 94 define the axis of revolution of the vehicle traction device and are driven from the drive shaft 112 for driving the traction device, it being understood that the elements 90, which are of substantially uniform length, are effective to transmit the torque from the drive shaft 112 and its associated tie members 92 to the wall 84 of the casing 82. Thus the vehicle traction device 80 is generally similar to the vehicle traction device of our above referred to copending application, Serial No. 504,435, now Patent No. 2,824,592 except that the vehicle traction device 80 is formed pursuant to the present invention in which the tie members 92 are drawn inwardly towards each other for correspondingly orienting the flexible elements 90, as described above. Accordingly, a casing or inflatable device of any predetermined configuration may be formed pursuant to the present invention, it being apparent that the specific configurations illustrated and described herein are given by way of example only. The end wall 88 is provided with a conventional valve 116 for inflating and deflating the air chamber defined by the casing 82 and the latter has an external layer 118 of fluid impervious material such as rubber, rubber compounds or the like to render said casing fluid impervious and to impart to the latter a frictional running surface. The casing 82 and the flexible elements 90 disposed therein may be formed of any suitable material and said elements 90 may be spaced in the casing in any desired manner.

Figure 13:
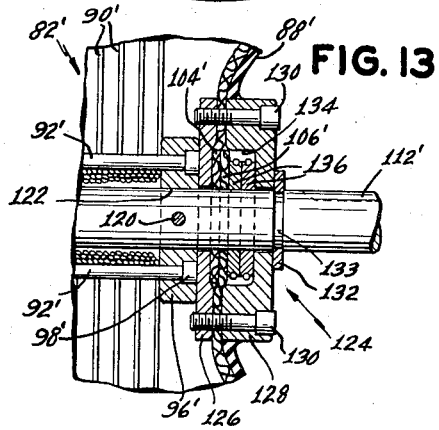
Fig. 13 is a fragmentary vertical sectional view of a modified form of vehicle traction device.

In order to inhibit the direct transmission of torque from the drive shaft 112 to the end walls 86 and 88 there is provided an arrangement shown in Fig. 13 in which the end walls 86' and 88' are rotatably mounted relative to the drive shaft 112' and the structure coupled thereto. In the arrangement shown in Fig. 13 the coupling part 96' is secured to the drive shaft 112' by means of a transverse pin or key 120. Thus the rotation of the shaft 112' will be effective to rotate the coupling part 96' and the tie members 92' coupled thereto so as to transmit the torque from the drive shaft to the cylindrical wall 84 of the casing. The shaft 112' extends through the casing 82' and through the coupling part 96' which is apertured as indicated at 122 for the extension therethrough of said drive shaft. The shaft 112' is rotatably mounted relative to the coupling device 124, the latter comprising a pair of complementary members 126 and 128 between which the inner portions 104' and 106' of the end wall 88' are clamped in fluid sealing relation. The members 126 and 128 are retained in clamped engagement by means of the series of peripherally spaced bolts 130. Thus the drive shaft 112' is rotatable relative to the clamping device 124 and the end wall 88' clamped thereto whereby the rotation of said drive shaft will not directly transmit the torque thereof to the end wall 88'. The clamping device 124 is retained in position on the shaft 112' by means of a suitable snap ring 132 disposed in the peripheral groove 113 of said shaft. The clamping member 128 is recessed as indicated at 134 and disposed in said recess are a pair of sealing rings 136 which provide a fluid seal at the shaft 112'. It will be apparent from the above that if slack is provided in the flexible elements 90' or if the latter should elongate in normal usage no adverse effect will be realized in this arrangement as the torque of the drive shaft will not be applied directly to the end walls on the rotation of the drive shaft since the latter is rotatably mounted relative to said end walls. Thus where slack is provided for develops in the flexible elements 90', the rotation of the shaft 112' will be effective to take up such slack at which time the torque of the drive shaft will be transmitted to the casing 82' by means of said flexible elements. Thus the provision of the relative rotation between the drive shaft and the end walls inhibits the direct transmission of substantial torque from said drive shaft to the end walls whereby to minimize or eliminate the danger of rupturing or weakening such end walls.

Figure 14:
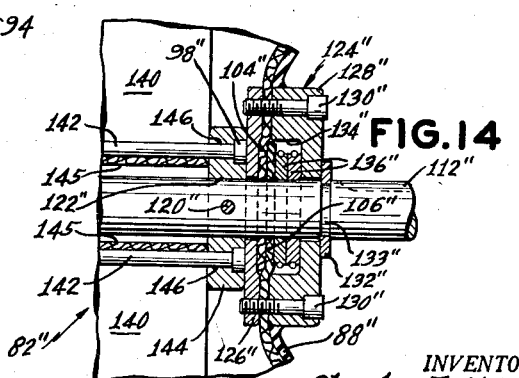
Fig. 14 is a view similar to Fig. 13 showing a further modified form of vehicle traction device.

With reference to Fig. 14, there is shown a vehicle traction device which is similar in all respects to the embodiment of Fig. 13 except that the casing structure 82" apart from the clamping devices is formed pursuant to the disclosure of our above referred to copending application, Serial No. 504,435, now Patent No. 2,824,592. The clamping device 124" corresponds in all respects to the clamping device 124 described above with the torque transmission elements being constituted by a series of sheet material portions or segments 140 which are adapted to transmit the torque of the drive shaft 112" to the casing. The rods 142 are supported at their opposite ends by means of retainer members 144, each rod being extended through a looped end 145 of the segments 140 and a companion pair of aligned apertures 146 provided in said retainer members. Thus the torque transmission elements 140 and the securement of such elements relative to the shaft 112" correspond in all respects to the arrangement illustrated and described in the aforereferred to copending application, Serial No. 504,435, now Patent No. 2,824,592. Accordingly, the shaft 112" is rotatable relative to the end wall 88" and the opposite end wall (not shown) so as to inhibit the direct transmission of substantial torque from said drive shaft to said end walls whereby to prevent excessive stresses being applied to said end walls especially where the torque transmission elements 140 have slack. Thus the embodiment of Fig. 14 corresponds in all respects to the embodiments disclosed in our copending application, Serial No. 504,435, now Patent No. 2,824,592 with the addition of clamping devices 124" which provide for the rotation of shaft 112" relative to its associated casing end walls. While in the embodiments of Figs. 12, 13 and 14 only one casing end wall and an associated clamping device is shown, it will be understood that the opposite casing end wall will be similarly constituted and will be provided with a similar clamping device.

Certain features of the present invention are disclosed in our application, Serial No. 504,436 filed April 28, 1955 for Inflatable Device of Predetermined Surface Contour and Method of Making Same, said application being assigned to the assignee herein, now Patent No. 2,824,589.

While we have shown and described the preferred embodiments of our invention, it will be understood that various changes may be made in the idea or principles of the invention within the scope of the appended claims.

Having thus described our invention, what we claim and desire to secure by Letters Patent is:

1. An inflatable device of predetermined surface contour, comprising a fluid-impervious inflatable flexible casing having an outer peripheral wall and being provided with means disposed internally thereof for internally reinforcing said casing, said means comprising a series of flexible elements extending internally into said casing from said outer peripheral wall thereof and secured at their opposite ends to opposite outer peripheral wall portions, respectively, of said casing, and means extending transversely of said flexible elements for orienting at least several of the latter in a predetermined disposition and for retaining said several elements in said disposition in the inflated condition of said casing.

2. An inflatable device of predetermined surface contour, comprising an inflatable casing having means disposed internally thereof for internally reinforcing said casing, said casing having an outer peripheral wall and defining an enclosed chamber in the inflated condition thereof, said means comprising a series of tension elements extending into said chamber and secured to opposite outer peripheral wall portions of said casing, and means extending internally of said casing in a predetermined relation to said tension elements for orienting at least several of the latter in a predetermined disposition and for retaining said several elements in said disposition in the inflated condition of said casing.

3. An inflatable device of predetermined surface contour, comprising a fluid-impervious inflatable flexible casing having an outer peripheral wall and being provided with means disposed internally thereof for internally reinforcing said casing, said means comprising a series of flexible elements extending into said casing from the outer peripheral wall thereof and secured at their opposite ends to opposite outer peripheral wall portions, respectively, of said casing, and a series of flexible tie elements extending transversely of said flexible elements for drawing at least several of the latter inwardly of said casing to thereby orient said several elements in a predetermined disposition and to retain the same in said disposition in the inflated condition of said casing.

4. An inflatable device of predetermined surface contour, comprising a fluid-impervious inflatable flexible casing having an outer peripheral wall and being provided with means disposed internally thereof for internally reinforcing said casing, said means comprising a series of flexible elements extending internally of said casing and secured at their opposite ends to opposite outer peripheral wall portions, respectively, of said casing, and a series of tie elements extending transversely of said flexible elements between opposite peripheral wall portions of said casing for drawing at last several of said flexible elements inwardly of said peripheral wall portions to thereby orient said several elements in a predetermined disposition relative to said peripheral wall portions and to retain the same in said disposition in the inflated condition of said casing.

5. An inflatable device of predetermined surface contour, comprising an inflatable flexible casing defining the outer periphery of said device and having means disposed internally thereof for internally reinforcing said casing, said means comprising a series of flexible elements extending internally of said casing and secured at their opposite ends to the outer peripheral opposite sides, respectively, of said casing, and means for internally reinforcing opposite peripheral wall portions of said casing comprising a series of tie elements extending transversely of said flexible elements between said opposite peripheral wall portions for drawing at last several of said flexible elements inwardly of said opposite wall portions to thereby orient said several elements in a predetermined disposition relative to said wall portions whereby to define tension elements for internally reinforcing said opposite wall portions.

6. An inflatable device of predetermined surface contour, comprising an inflatable flexible casing having an outer peripheral wall and being provided with means disposed internally thereof for internally reinforcing said casing, said means comprising a series of flexible elements extending internally of said casing and secured at their opposite ends to opposite outer peripheral wall portions, respectively, of said casing, and means for internally reinforcing said opposite peripheral wall portions of said casing comprising a series of tie elements extending transversely of said flexible elements between said opposite peripheral wall portions for drawing at least several of said flexible elements inwardly of said opposite wall portions to thereby orient said several elements in a predetermined disposition relative to said wall portions whereby to define tension elements for internally reinforcing said opposite wall portions, said opposite peripheral wall portions being of generally arcuate configuration and said several elements extending radially from the opposite ends of said tie elements to said arcuate wall portions, respectively.

7. An inflatable device of predetermined surface contour, comprising an inflatable flexible casing having means disposed internally thereof for internally reinforcing said casing, said means comprising a series of flexible elements extending internally into said casing from the well thereof and secured at their opposite ends to the opposite sides, respectively, of said casing, and means for internally reinforcing opposite wall portions of said casing comprising a series of tie elements extending transversely of said flexible elements between said opposite wall portions for drawing at least several of said flexible elements inwardly of said opposite wall portions to thereby orient said several elements in a predetermined disposition relative to said wall portions whereby to define tension elements for internally reinforcing said opposite wall portions, said tie elements being constituted by cords looped around companion groups of flexible elements including said several elements, said cords extending substantially medially of said opposite sides in planes substantially parallel to said opposite sides.

8. An inflatable device of predetermined surface contour, comprising an inflatable flexible casing having means disposed internally thereof for internally reinforcing said casing, said means comprising a series of flexible elements extending internally of said casing and secured at their opposite ends to the opposite sides, respectively, of said casing, and means for internally reinforcing opposite wall portions of said casing comprising a series of tie elements extending transversely of said flexible elements between said opposite wall portions for drawing at least several of said flexible elements inwardly of said opposite wall portions to thereby orient said several elements in a predetermined disposition relative to said wall portions whereby to define tension elements for internally reinforcing said opposite wall portions, said casing being formed of mattress fabric comprising a pair of woven spaced fabrics interconnected by intermediate threads extending therebetween and woven thereto which define said flexible elements.

9. An inflatable device of predetermined surface contour, comprising an inflatable flexible casing having means disposed internally thereof for internally reinforcing said casing, said means comprising a series of flexible elements extending internally into said casing from the wall thereof and secured at their opposite ends to the opposite sides, respectively, of said casing, and means for internally reinforcing opposite wall portions of said casing comprising a series of cords extending transversely of said flexible elements between said opposite wall portions, said cords being looped around companion groups of flexible elements for drawing at least several of said flexible elements in the region of the opposite ends of said cords inwardly of said opposite wall portions to thereby orient said several elements in a predetermined disposition relative to said wall portions whereby to define tension elements for internally reinforcing said opposite wall portions.

10. An inflatable device of predetermined surface contour, comprising an inflatable flexible casing having means disposed internally thereof for internally reinforcing said casing, said means comprising a series of flexible elements extending internally of said casing and secured at their opposite ends to the opposite sides, respectively, of said casing, and means for internally reinforcing opposite peripheral wall portions of said casing comprising a pair of laterally spaced relatively rigid tie members extending transversely of said flexible elements between said opposite peripheral wall portions, and means for securing said tie members in predetermined spaced relation for drawing at least several of said flexible elements inwardly of said opposite wall portions to thereby orient said several elements in a predetermined disposition relative to said wall portions whereby to define tension elements for internally reinforcing said opposite wall portions.

11. An inflatable device of predetermined surface contour, comprising an inflatable flexible casing having means disposed internally thereof for internally reinforcing said casing, said means comprising a series of flexible elements extending internally of said casing and secured at their opposite ends to the opposite sides, respectively, of said casing, and means for internally reinforcing opposite wall portions of said casing comprising a pair of laterally spaced relatively rigid tie members extending transversely of said flexible elements between said opposite wall portions, and means for securing said tie members in predetermined spaced relation for drawing at least several of said flexible elements in the region adjacent said opposite wall portions inwardly thereof to thereby orient said several elements in a predetermined disposition relative to said wall portions whereby to define tension elements for internally reinforcing said opposite wall portions, said casing being formed of mattress fabric comprising a pair of woven spaced fabrics interconnected by intermediate threads extending therebetween and woven thereto which define said flexible elements.

12. A method of making an inflatable device of predetermined surface contour, comprising the steps of forming a casing of flexible fluid-impervious material having a series of tension elements secured to opposite wall portions of said casing, and drawing inwardly of said casing a plurality of said tension elements for orienting the latter in a predetermined disposition in the inflated condition of said casing and securing said plurality of elements in said disposition.

13. A method of making an inflatable device of predetermined surface contour, comprising the steps of forming an inflatable flexible casing having a series of flexible elements extending internally of said casing and secured at their opposite ends to the opposite sides, respectively, of said casing, and drawing at least several of said flexible elements inwardly of opposite wall portions of said casing and retaining said several elements in said drawn condition to thereby orient said several elements in a predetermined disposition relative to said wall portions in the inflated condition of said casing whereby to define tension elements for internally reinforcing said opposite wall portions in the inflated condition of said casing.

References Cited in the file of this patent

UNITED STATES PATENTS

| | | |
|---|---|---|
| 818,321 | Whall | Apr. 17, 1906 |
| 1,942,018 | Blackwood | Jan. 2, 1934 |
| 2,016,054 | Sentell | Oct. 1, 1935 |
| 2,431,897 | Wensley | Dec. 2, 1947 |
| 2,604,641 | Reed | July 29, 1952 |
| 2,743,510 | Mauney | May 1, 1956 |
| 2,824,592 | Neisler et al. | Feb. 25, 1958 |

FOREIGN PATENTS

| | | |
|---|---|---|
| 504,910 | Canada | Aug. 3, 1954 |